United States Patent [19]

Puthawala

[11] 4,289,407

[45] Sep. 15, 1981

[54] METHOD FOR BINDING LIQUID-CONTAINING RADIOACTIVE WASTES AND KNEADING MACHINE THEREFOR

[75] Inventor: Anwer Puthawala, Erlangen, Fed. Rep. of Germany

[73] Assignee: Kraftwerk Union Aktiengesellschaft, Mulheim an der Ruhr, Fed. Rep. of Germany

[21] Appl. No.: 94,197

[22] Filed: Nov. 14, 1979

Related U.S. Application Data

[62] Division of Ser. No. 813,476, Jul. 7, 1977, Pat. No. 4,194,842.

[30] Foreign Application Priority Data

Jul. 12, 1976 [DE] Fed. Rep. of Germany ....... 2631326

[51] Int. Cl.$^{3}$ .......................... B29B 1/06; B01F 15/06

[52] U.S. Cl. .......................................... 366/75; 366/76; 366/138; 366/144

[58] Field of Search ........................ 366/75, 77, 76, 79, 366/83, 10, 69, 85, 97, 102, 103, 138, 144–147; 425/207, 208, 203; 159/2 E

[56] References Cited

U.S. PATENT DOCUMENTS

| | | | |
|---|---|---|---|
| 3,495,808 | 2/1970 | Klein | 366/142 |
| 3,737,151 | 6/1973 | Schaeffer | 366/75 |
| 3,917,507 | 11/1975 | Skidmore | 366/75 |
| 3,963,558 | 6/1976 | Skidmore | 366/83 |
| 4,051,212 | 9/1977 | Grigat | 366/75 |
| 4,100,244 | 7/1978 | Nonaka | 366/75 |

*Primary Examiner*—Robert W. Jenkins
*Attorney, Agent, or Firm*—Herbert L. Lerner

[57] ABSTRACT

Liquid-containing radioactive wastes are bound into thermoplastic material by introducing particles of thermoplastic material at a non-sticking temperature into a kneading machine, heating the thermoplastic material in the absence of radioactive wastes to at least 100° C., adding the liquid-containing wastes to the heated thermoplastic material, mixing and concurrently increasing the temperature of the mixture to a temperature of about 200° C. or more to vaporize liquid in the mixture, maintaining the mixture at a vaporization temperature to dry to the mixture, releasing evolved vapors and discharging the dried mixture from the kneading machine. Difficulties due to clogging of the kneading machine and fluctuations in the consistency of the dried end product are minimized.

2 Claims, 1 Drawing Figure

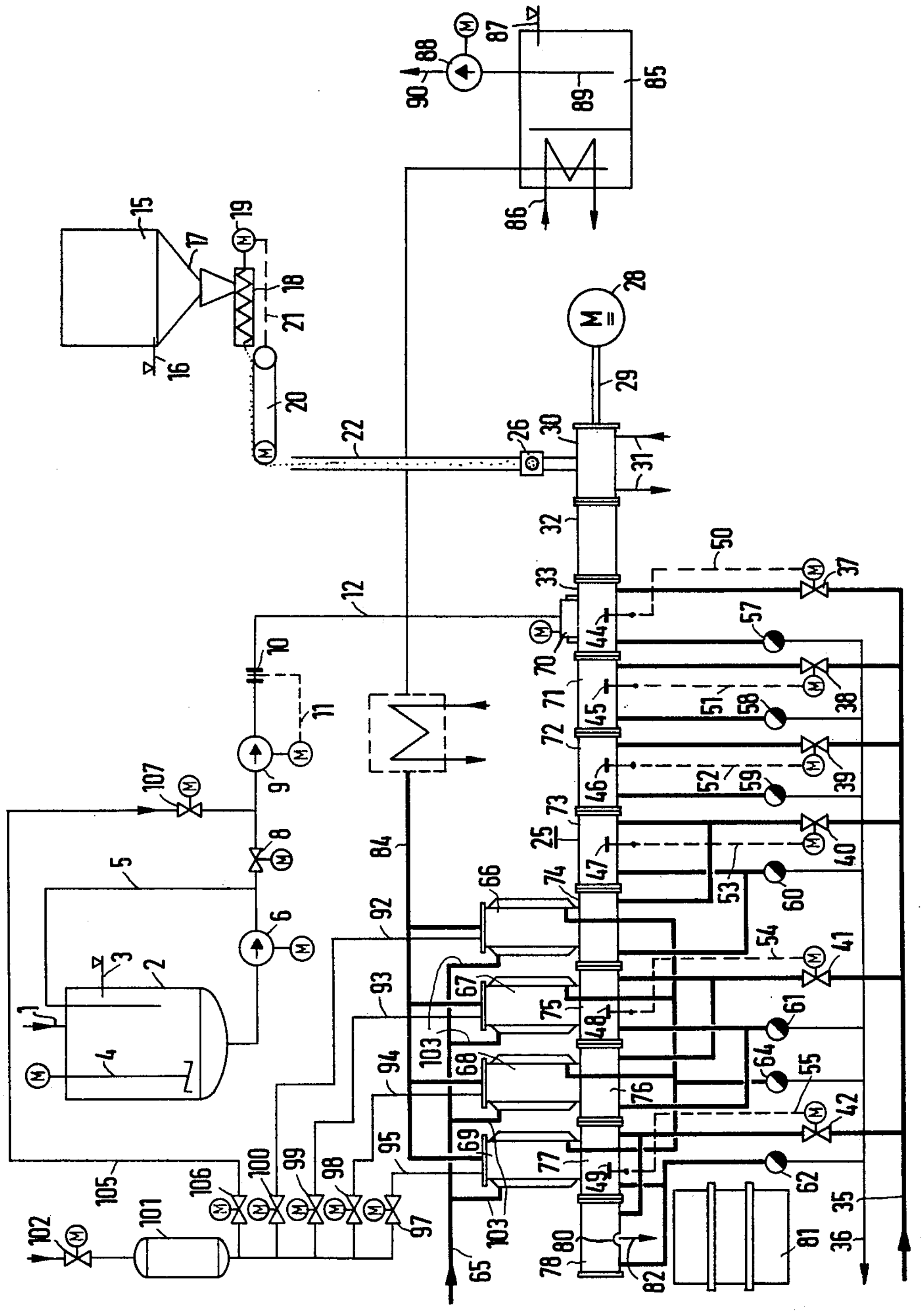

METHOD FOR BINDING LIQUID-CONTAINING RADIOACTIVE WASTES AND KNEADING MACHINE THEREFOR

This is a division of application Ser. No. 813,476, filed July 7, 1977, now U.S. Pat. No. 4,194,842.

BACKGROUND OF THE INVENTION

1. Field of the Invention

This invention relates to a method and apparatus for binding liquid-containing radioactive waste into thermoplastic material by means of a kneading machine.

2. Description of the Prior Art

German Published Non-Prosecuted Application No. 21 35 328 describes a kneading device in the form of a worm press for binding waste into plastic material. The kneading machine is kept at a temperature of, for instance, 200° C. The concentrate of radioactive solutions to be bound into plastic material is dried as evaporation of the water takes place at these temperatures. At the same time, the plastic, which is added in the form of powder, is liquefied, so that it can be mixed with the solids. In the known method, however, difficulties have been encountered due to clogging of the kneading device and also because the consistency of the end product showed undesirable fluctuations.

SUMMARY OF THE INVENTION

An object of the present invention is to provide a method for binding liquid-containing radioactive waste into thermoplastic material by means of a kneading machine with avoidance of disturbances in the operating circle such as clogging of the kneading device and fluctuations in the consistency of the end product.

Another object of the invention is to provide an efficient method and apparatus for cleaning the kneading machine used for binding liquid-containing radioactive waste into thermoplastic material.

With the foregoing and other objects in view, there is provided in accordance with the invention a method for binding liquid-containing radioactive wastes by kneading the wastes in admixture with a thermoplastic material in a kneading machine, introducing the thermoplastic material in particle form and at a temperature at which the particles will not stick together, into the kneading machine, heating the thermoplastic material in the kneading machine in the absence of the liquid-containing wastes to a temperature of at least 100° C., introducing liquid-containing wastes into the kneading machine to the thus heated thermoplastic material, mixing the thermoplastic material and liquid-containing wastes in the kneading machine and concurrently increasing the temperature of the mixture to a temperature at which vaporization of the liquid will occur, maintaining the mixture of thermoplastic material and liquid-containing wastes at a vaporization temperature to effect drying of the mixture, releasing vapors evolved from the mixture by vaporization from the kneading machine, and discharging the dried mixture of liquid-containing wastes and thermoplastic material from the kneading machine.

In a preferred embodiment, the kneading machine is a worm press and the thermoplastic material introduced into the kneading machine is cooled in the kneading machine to prevent rise in temperature of the thermoplastic material to a temperature at which the particles of thermoplastic material will stick together prior to the entrance of the particles into the threads of the worm press.

There is provided in accordance with the invention an apparatus for binding liquid-containing radioactive wastes in admixture with a thermoplastic material in a worm press kneading machine having a housing enclosing a worm to mix the wastes and thermoplastic material and heating means to heat the mixture, domes disposed above the housing and connected thereto into which domes vapor from the mixture is released from the housing into the domes, and vapor outlets in the domes, an external vessel containing a liquid cleaning agent and lines with control valves connecting the external vessel with the domes in vicinity of the vapor outlets for the introduction of liquid cleaning agent.

Other features which are considered as characteristic for the invention are set forth in the appended claims.

Although the invention is illustrated and described herein as embodied in a method for binding liquid-containing radioactive wastes and kneading machine therefor, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing which diagrammatically shows a facility for binding liquid-containing radioactive wastes.

DETAILED DESCRIPTION OF THE INVENTION

The thermoplastic material is fed to the kneading machine at ambient or room temperature or any low temperature at which the particles of thermoplastic material will not stick together. The thermoplastic material is heated in the kneading device in the absence of liquid-containing waste, to at least 100° C., preferably to a temperature within the range of 100°–150° C. The waste materials containing liquid are added to the heated thermoplastic material. The thermoplastic and the waste materials are mixed in the kneading machine at a temperature which rises from 100° to 200°–220° C. or more. The high temperature is maintained and the mixture is dried by evaporation. The liquid-containing radioactive wastes are usually aqueous concentrates of a coolant treatment system for a pressurized-water nuclear power reactor although other liquid-containing radioactive wastes may be treated. The steamed-out mixture is removed mechanically from the kneading device. The special conditions in accordance with the invention makes the handling of the plastic free of disturbances and an end product of the desired uniformity is obtained which is eminently suitable for the ultimate storage. The invention proved out excellently in tests.

The liquid-containing radioactive wastes are preferably stirred prior to entering the kneading device and can be preheated up to about 70° C. The steam generated during the drying of the wastes in the kneading device can advantageously be condensed by introducing it into a water bath, i.e. a body of water. This differs from known kneading devices, in which a cooler is provided in the outlet line, i.e., practically at the kneading device, as shown in the drawing by a square in dashed lines.

Conducting the steam into a water bath, furnishes not only the cooling required for condensing and precipitating the steam, but at the same time effects a washing-out of components that may be carried along with the steam. These components or impurities may be processed further in the form of a liquid solution or slurry.

Radioactive wastes and other impurities tend after long continued operation to accumulate in the kneading machine. To permit continued operation without complete shutdown and dismantling the equipment for shutdown, the addition of the wastes is temporarily halted at intervals before too large a build-up of impurities and replaced by the addition of water and the water is evaporated in the kneading device. Thereby, a cleaning of the entire kneading machine is achieved, which helps to reduce the radiation in the vicinity of the kneading machine. In addition, a caking-on of plastic and/or waste is avoided, which could, purely mechanically, overload the kneading machine.

The drying can take place at subatmospheric or reduced pressure of about 300 Torr or lower. For this purpose, the entire kneading machine or sections of the machine may be operated under reduced pressure.

The known worm presses such as are described, for instance, in the Austrian Pat. No. 266 268 are suitable as a kneading device. In such worm presses, outlet openings for steam are customarily provided. Connections for feeding-in a cleaning fluid are provided in the vicinity of the outlet openings, in accordance with the invention. Thus, the outlet openings and the piping connected thereto can be cleaned without interruption of the operation, and in particular, without using personnel, so that the radiation exposure remains quite low.

In the attached drawing, in which a facility for binding liquid-containing radioactive wastes is shown schematically, the liquid radioactive wastes are fed into a concentrate tank 2 via a line 1 with the liquid level in tank 2 being brought to a desired height by means of a control device 3. A stirrer 4 is arranged in the concentrate tank 2 to prevent the solid wastes from stratifying and settling. There is further provided for the same purpose, a recirculation line 5 through which liquid can be circulated by means of a pump 6. The recirculation line 5 is connected to a valve 8 and a metering pump 9 controlled by a measuring device 10, as indicated by the functional line 11. This determines rate of the concentrate into a feed line 12 with sufficient accuracy.

Polyethylene or polystyrene can be used for the purpose of binding the wastes into thermoplastic material. However, other thermoplastic materials such as, for example, polyacrylates may also be used. Any synthetic material may also be included, which has properties similar to the examples mentioned and which results in a final solid product, which can be ultimately stored without danger of leaching-out the radioactive wastes.

The plastic, i.e., polyethylene in the form of granules in this example, is present in a supply tank 15, in which a minimum level is maintained by means of a control device 16. The tank has a volume of 500 l. The plastic granules pour through a hole in the conical bottom 17 of the tank 15. A conveyer screw 18 with a drive motor 19 to a conveyer scale 20, serves to dose the quantity of granulate. For this purpose, the scale controls the speed of the motor 19, as indicated by the functional line 21, so that a definite amount of granulate is fed through a gravity pipe 22 to the kneading machine designated generally by the numeral 25. A viewing glass 26 is provided in the gravity pipe 22, so that the flow of the granulate can be observed. It is important that the granulate gets into the kneading machine 25 at a low temperature, preferably at ambient or room temperature, i.e., at about 20° C., so that is remains in free-flowing granular form and does not stick together.

The kneading machine 25 has eleven housing sections, which are combined to form a two-thread worm press. With reference to the drawing, transport direction is from right to left. A thyristor-controlled D-C reduction motor 28 is provided for driving the worm press. The motor 28 may have a power of between 0 and 30 kW and a speed adjustable in the range between 0 and 300 RPM. The motor 28 acts on the drive shaft 29 of the kneading machine 25 via a coupling, not shown in the drawing.

The first housing section 30 is the feed part for the plastic. This part is likewise held at room temperature (20°C.) by means of cooling water lines 31. This facilitates the entry of the plastic granulate into the threads of the worm press. In the following housing part 32, the temperature rises, as the heat generated in the processing in the kneading machine is no longer removed and also because the housing part 33 adjacent thereto is equipped with a heater. A final temperature of about 140° C. is reached, so that the housing 32 practically forms the melting section for the granulate. At the end of the housing 32, the plastic is therefore present in highly viscous form.

Saturated steam of, say, 20 bar is used for heating the kneading machine 25. The steam is fed via a line 35 to the kneading machine at different points, described in detail later on. The condensate produced in the heating process is returned to the steam generator via the line 36. To the steam line 35 are connected motor-positioned valves 37 to 42, which are controlled by thermocouples 44 to 49, as is indicated by the functional lines 50 to 55. The condensate is discharged via valves 57 to 62. An outlet valve 64, which is associated with steam domes heated by a steam line 65, also leads into the same condensate line 36.

A temperature of about 140°C. is maintained in the housing 33 as a result of heating. There, a motor-driven conveyer screw 70 is provided to feed-in the concentrate from the line 12. A temperature of about 160° C. is reached in the following housing 71 by further heating. The heating in the housing part 72 is controlled so that a temperature of about 175° C. is maintained with a tolerance range of 35 20° C. A deviation of the same order of magnitude applies also for the following nominal values of the housing temperatures, namely: 200° C. for the housing part 73, 180° C. for the housing part 74, 200° C. for the housing part 75 and 215° C. for the adjacent housing parts 76, 77 and 78.

The housing part 78 is designed as an outlet. There, a discharge opening 80 is provided, from which the mixture of thermoplastic material and concentrate is filled into a standard cask 81, as indicated by the arrow 82. The mixture is transported mechanically up to the discharge opening in order to avoid disturbances due to sticking or caking.

The steam produced during the drying of the concentrate is drawn off from the steam domes 66 to 69 and is removed via an outlet line 84, which ends in a water tank 85. The water tank 85 is held at a lower temperature, e.g., room temperature, by means of a cooling coil 86. Its water level is adjusted by a control device 87. If necessary, a distillate pump 88 with a suction line 89 pumps the distillate into a waste water purification plant, as is indicated by the arrow 90. Line 84 may contain a cooler, as shown in dotted lines, although condensing steam in tank 85 only gives the advantage, that volatile substances form on easy to be handled aqueous solution. Lines 92, 93, 94 and 95 as shown in the drawing are connected to the steam domes 66 to 69. These lines lead to a tank 101 via valves 97 to 100. The tank 101 contains a cleaning liquid, with if desired suitable additives, such as a decontamination agent. The cleaning liquid and additive can be replenished through the line having a control valve 102. By means of the line connections 92 to 95, the steam domes 66 to 69 may be cleaned by remote control without using personnel sensitive to radiation exposure and also to flush out solid residue. For the same purpose, the steam of the line 65 can be applied to so-called steam launchers, by which a strong steam jet can be directed toward the inside of the domes 66 to 69.

The tank 101 can also be connected to the line 12 via a line 105 with the control valves 106 and 107. Cleaning water can thereby be introduced into the line 12 after a definite operating time, with, of course, having first stopped the feeding of the wastes in that line. The water is evaporated in the kneading machine 25 and in the process carries along precipitates which are transported with the plastic to the outlet opening 80.

There are claimed:

1. In apparatus for binding liquid-containing radioactive wastes in admixture with a thermoplastic material in a worm press kneading machine having a housing enclosing a worm to mix the wastes and thermoplastic material and heating means to heat the mixture, domes disposed above the housing and connected thereto into which domes vapor from the mixture is released from the housing into the domes, and vapor outlets in the domes, the improvement which comprises an external vessel containing a liquid cleaning agent and lines with control valves connecting the external vessel with the domes in the vicinity of the vapor outlets for the introduction of liquid cleaning agent.

2. Apparatus as claimed in claim 1, including steam inlets in the domes to direct strong steam jet toward the inside of the domes to effect cleaning of the interior of the domes.

* * * * *